United States Patent [19]
Aminaka et al.

[11] Patent Number: 5,952,449
[45] Date of Patent: Sep. 14, 1999

[54] METHOD FOR PRODUCING AN AROMATIC POLYCARBONATE

[75] Inventors: Muneaki Aminaka, Okayama; Kyosuke Komiya; Kazumi Hasegawa, both of Kurashiki, all of Japan

[73] Assignee: Asahi Kasei Kogyo Kabushiki Kaisha, Osaka, Japan

[21] Appl. No.: 09/053,656

[22] Filed: Apr. 2, 1998

[30] Foreign Application Priority Data

Apr. 2, 1997 [JP] Japan .................................. 9-084185

[51] Int. Cl.⁶ .................................................. C08G 64/00
[52] U.S. Cl. ........................ 528/196; 138/177; 138/178
[58] Field of Search ............................ 528/196; 138/177, 138/178

[56] References Cited

U.S. PATENT DOCUMENTS 5,405,934  4/1995  Oshina et al. .

FOREIGN PATENT DOCUMENTS

0615996 A1  9/1994  European Pat. Off. .
6-56984  3/1994  Japan .
6-345860  12/1994  Japan .

*Primary Examiner*—Terressa Mosley
*Attorney, Agent, or Firm*—Birch, Stewart, Kolasch & Birch, LLP

[57] ABSTRACT

A method for producing an aromatic polycarbonate, which comprises subjecting to a transesterification polymerization reaction at least one polymerizable material for an aromatic polycarbonate. The transesterification polymerization reaction is performed in one or more polymerizers which is or are connected through a pipeline system. The pipeline system comprises one or more pipes through which a molten aromatic polycarbonate having a number average molecular weight increased by the transesterification polymerization reaction is passed while contacting an inner wall of the pipe or pipes. The pipeline system has at least one viscous polycarbonate passage region in which a molten aromatic polycarbonate having a number average molecular weight of 4,000 or more is passed through the pipe. The pipes in the viscous polycarbonate passage region of the pipeline system have no bent portion or not more than 50 bent portions in total. A high quality aromatic polycarbonate is produced, which is colorless and has a low foreign matter content.

10 Claims, 5 Drawing Sheets

METHOD FOR PRODUCING AN AROMATIC POLYCARBONATE

BACKGROUND OF THE INVENTION

1. Field of the Invention

The present invention relates to a method for producing an aromatic polycarbonate. More particularly, the present invention is concerned with a method for producing an aromatic polycarbonate, which comprises subjecting to a transesterification polymerization reaction at least one polymerizable material for an aromatic polycarbonate, the transesterification polymerization reaction being performed in one or more polymerizers which is or are connected through a pipeline system toward an outlet for a final aromatic polycarbonate product, wherein the pipeline system comprises one or more pipes through which a molten aromatic polycarbonate having a number average molecular weight increased by the transesterification polymerization reaction is passed while contacting an inner wall of the pipe or pipes, wherein the pipeline system has at least one viscous polycarbonate passage region in which a molten aromatic polycarbonate having a number average molecular weight of 4,000 or more is passed through the pipe, and wherein use is made of a pipeline system in which the pipe or pipes in the at least one viscous polycarbonate passage region have no bent portion or not more than 50 bent portions in total. The method of the present invention is advantageous not only in that a high quality aromatic polycarbonate which is not only highly colorless, but also has a low foreign matter content can be easily produced, but also in that there is no need for a step of forcibly passing a final molten polycarbonate product (inherently having a high melt viscosity) through a polymer filter by using an extruder, so that problems do not arise, such as clogging of the polymer filter or an increase in load on the extruder.

2. Prior Art

In recent years, aromatic polycarbonates have been widely used in various fields as engineering plastics having excellent heat resistance, impact resistance and transparency. Use of aromatic polycarbonates has been rapidly expanding especially as a material for an optical disk substrate. With respect to methods for producing aromatic polycarbonates, various studies have heretofore been made. Of the methods studied, a process utilizing an interfacial polycondensation between an aqueous alkali solution of an aromatic dihydroxy compound, such as 2,2'-bis(4-hydroxyphenyl) propane (hereinafter, frequently referred to as "bisphenol A"), and phosgene in the presence of an organic solvent has been commercially practiced. The organic solvent used for the above-mentioned interfacial polycondensation process is a halogen-containing organic solvent, such as methylene chloride or chlorobenzene. Of these, methylene chloride is usually used.

However, the interfacial polycondensation process has a problem in that difficulties are encountered in separating and removing the organic solvent from the obtained polymer. Therefore, due to the presence of a halogen derived from the remaining organic solvent, problems arise not only in that corrosion occurs in the mold used for the molding of the obtained aromatic polycarbonate, but also in that the obtained aromatic polycarbonate suffers a discoloration, leading to a lowering in quality of the aromatic polycarbonate. Especially when the obtained aromatic polycarbonate is used for an optical disk substrate, the interfacial polycondensation process has a fatal problem in that the remaining halogen in the polycarbonate causes corrosion of the recording layer of such optical disk, thus causing an error in the recording of information.

With respect to a method for producing an aromatic polycarbonate from an aromatic dihydroxy compound and a diaryl carbonate, in a conventionally known melt transesterification process, an aromatic polycarbonate is produced by a transesterification polymerization reaction between bisphenol A and diphenyl carbonate in the molten state, while removing a by-produced phenolic compound (phenol). Unlike the interfacial polycondensation process, the melt transesterification process has an advantage in that a solvent need not be used. However, the melt transesterification process has a serious problem in that the produced polycarbonate contains foreign matter as an impurity. The mechanisms of the occurrence of such foreign matter in the produced polycarbonate have not been elucidated yet, including whether it is generated during the reaction or it is inadvertently introduced through the raw materials for a polycarbonate or through the materials of the production equipment. It has generally been attempted to remove the foreign matter from the obtained polycarbonate. However, since the viscosity of a molten polycarbonate is high, it is difficult to remove the foreign matter, especially foreign matter particles having an extremely small size, from the polycarbonate.

When the obtained aromatic polycarbonate is used in the optical application field, especially in the production of an optical disk, the presence of extremely small foreign matter particles contained in the polycarbonate creates a serious optical defect, causing a bit-error in optically reading information recorded on a shaped article produced from the polycarbonate.

As a method for producing an aromatic polycarbonate with a low foreign matter content by the melt transesterification process, Unexamined Japanese Patent Application Laid-Open Specification No. 5-239334 (corresponding to EP 615996 A1) discloses a method in which an aromatic dihydroxy compound and a carbonic diester are subjected to a melt transesterification in the presence of a catalyst to obtain a polycarbonate in the molten state, and additives are added to and kneaded with the obtained molten polycarbonate before solidification thereof, and, optionally, the resultant kneaded polycarbonate composition is subjected to filtration by using a polymer filter, to thereby obtain a polycarbonate having a low foreign matter content, which can be used for producing optical articles. (In this method, the addition of additives before solidification of the obtained molten polycarbonate is intended to reduce the chance of occurrence of foreign matter by reducing the number of times of melting of the obtained polycarbonate.) However, this method has a problem in that, although the content of foreign matter having a relatively large particle diameter, namely, 1 $\mu$m or more, can be reduced, the content of foreign matter having a particle diameter as small as less than 1 $\mu$m cannot be satisfactorily reduced. Moreover, it is economically and practically disadvantageous to use a high precision polymer filter having a pore size corresponding to a filtration cut-off size of less than 1 $\mu$m; the reasons for this reside in that, when a molten polycarbonate (inherently having a high melt viscosity) is forcibly passed through such a high precision filter by using an extruder, the load sustained on the extruder is extremely large, and also that such a high precision filter is likely to be clogged. In fact, the polymer filter used in the working examples of the above-mentioned patent document has a pore size corresponding to a filtration cut-off size larger than 5 $\mu$m, and there is no description therein concerning the content of foreign matter having a size smaller than 1 $\mu$m.

Unexamined Japanese Patent Application Laid-Open Specification No. 6-234845 (corresponding to U.S. Pat. No. 5,525,701) discloses a method in which an aromatic dihydroxy compound and a carbonic diester are subjected to a successive melt transesterification by using at least two reactors which are connected in series, wherein each of the final reactor and a reactor immediately preceding the final reactor has at least one polymer filter provided at an outlet thereof. However, in this method, the polymer filter equipped at the outlet of the final reactor has a pore size corresponding to a filtration cut-off size of 5 $\mu$m or more, so that the content of foreign matter having a size of less than 1 $\mu$m cannot be reduced.

Unexamined Japanese Patent Application Laid-Open Specification No. 7-207015 teaches that, when an aromatic dihydroxy compound and a diaryl carbonate are subjected to melt transesterification in the presence of lithium phthalimide, side reactions can be suppressed, so that suppression can be achieved to some extent with respect to the formation of foreign matter which is generated by a branching reaction and is insoluble in a solvent, such as methylene chloride. By this method, the content of foreign matter having a size of 1 $\mu$m or more can be reduced; however, by this method, the content of foreign matter having a size of less than 1 $\mu$m cannot be reduced to a satisfactorily low level.

As is apparent from the above, a method is not known at all which can be used for producing a transesterified polycarbonate in which the content of extremely small foreign matter having a size of less than 1 $\mu$m is reduced to a satisfactorily low level.

SUMMARY OF INVENTION

The present inventors have conducted extensive and intensive studies with a view toward solving the above-mentioned problems accompanying the prior art, in connection with the method for producing an aromatic polycarbonate which comprises subjecting to a transesterification polymerization reaction at least one polymerizable material for an aromatic polycarbonate, the transesterification polymerization reaction being performed in one or more polymerizers which is or are connected through a pipeline system toward an outlet for a final aromatic polycarbonate product, wherein the pipeline system comprises one or more pipes through which a molten aromatic polycarbonate having a number average molecular weight increased by the transesterification polymerization reaction is passed while contacting an inner wall of the pipe or pipes, and wherein the pipeline system has at least one viscous polycarbonate passage region in which a molten aromatic polycarbonate having a number average molecular weight of 4,000 or more is passed through the pipe. As a result, it has unexpectedly been found that the above-mentioned problems inevitably accompanying the conventional techniques can be solved by using a pipeline system in which the pipe or pipes in the at least one viscous polycarbonate passage region have no bent portion or not more than 50 bent portions in total.

Based on this novel finding, the present invention has been completed.

It is, therefore, a primary object of the present invention to provide a method which can be used for easily producing a high quality aromatic polycarbonate, which is not only highly colorless, but also has a low foreign matter content, without a need for a step of forcibly passing a final molten polycarbonate product (inherently having a high melt viscosity) through a polymer filter by using an extruder, so that problems do not arise, such as clogging of the polymer filter or an increase in load on the extruder.

The foregoing and other objects, features and advantages of the present invention will become apparent from the following detailed description and appended claims taken in connection with the accompanying drawings.

DESCRIPTION OF REFERENCE NUMERALS

101: Internal space of a pipe

Figure 1:
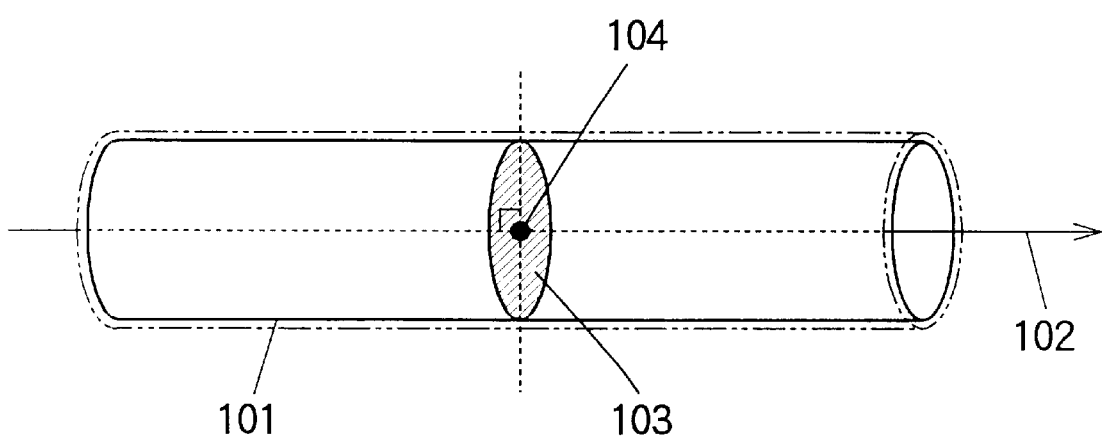
FIG. 1 is an explanatory view of one form of the internal space of a pipe of the pipeline system used in the method of the present invention, showing the relationships between the flow direction of a molten polycarbonate passed through the pipe, an inside cross-section taken along a plane perpendicular to the flow direction, and the centroid of the figure of the inside cross-section.
Figure 2A:
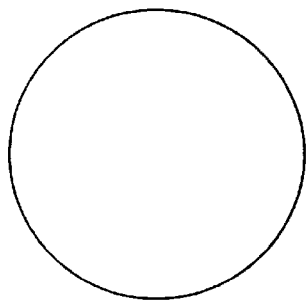
FIGS. 2(a) to 2(k) and 2(m) are various examples of figures of the inside cross-sections of a pipe of the pipeline system used in the method of the present invention.
Figure 2B:
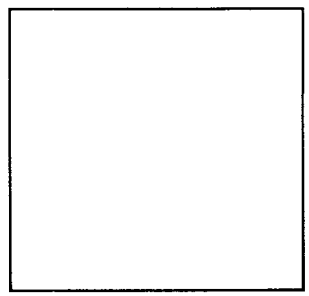
Figure 2C:
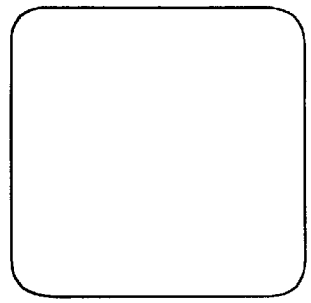
Figure 2D:
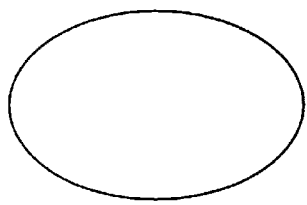
Figure 2E:
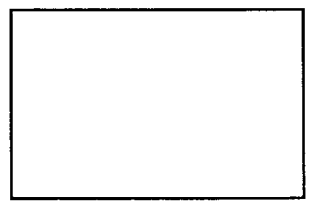
Figure 2F:
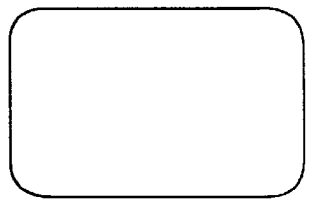
Figure 2G:
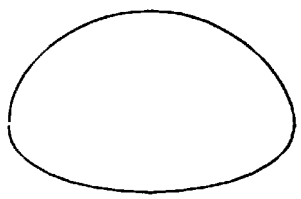
Figure 2H:
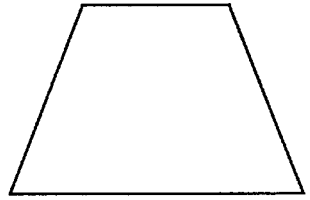
Figure 2I:
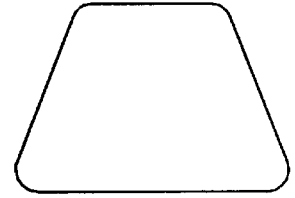
Figure 2J:
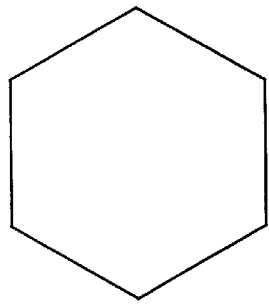
Figure 2K:
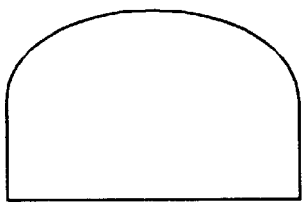
Figure 2M:
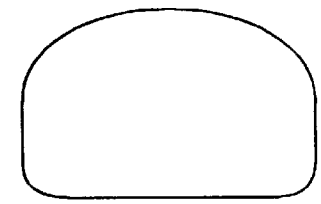

102: Flow direction of a molten polycarbonate in the pipe

103: Inside cross-section of the pipe

104: Centroid of the figure of inside cross-section 103 of the pipe

R: Curvature radius

301: Central line

302: Imaginary curvature circle

303A: Contact point between a central line and an imaginary curvature circle

303B: Contact arc between a central line and an imaginary curvature circle

303C: Corner in a central line 1A, 1B: Inlet for a polymerizable material 2A, 2B, 16, 27, 38, 47: Vent 3A, 3B: Vertical agitation type polymerizer vessel 4A, 4B: Agitator 5A, 5B, 18, 28, 39: Molten polymer 6A, 6B, 20, 29, 40, 48: Outlet 7, 9, 21, 30, 32, 41, 43, 49: Pipe 8, 19, 31: Transfer pump 42: Discharge pump 50: Gear pump 10: Main body of free-fall polymerizer 11, 22, 33, 45: Inlet
12: Recirculation line
13, 24, 35: Perforated plate
14: Molten polymer in the form of a filament
15, 26, 37: Gas feed port
17: Recirculation pump
23: Main body of first guide-wetting fall polymerizer
34: Main body of second guide-wetting fall polymerizer
25, 36: Guide in the form of a wire
44: Withdrawal port
46: Horizontal twin-screw agitation type polymerizer
51: Polymer filter

DETAILED DESCRIPTION OF THE INVENTION

According to the present invention, there is provided a method for producing an aromatic polycarbonate which comprises subjecting to a transesterification polymerization reaction at least one polymerizable material selected from the group consisting of:

a molten monomer mixture of an aromatic dihydroxy compound and a diaryl carbonate, and a molten prepolymer obtained by reacting an aromatic dihydroxy compound with a diaryl carbonate, the transesterification polymerization reaction being performed in one or more polymerizers which is or are connected through a pipeline system toward an outlet for a final aromatic polycarbonate product, wherein the pipeline system comprises one or more pipes through which a molten aromatic polycarbonate having a number average molecular weight increased by the transesterification polymerization reaction is passed while contacting an inner wall of the pipe or pipes, the pipeline system having at least one viscous polycarbonate passage region in which a molten aromatic polycarbonate having a number average molecular weight of 4,000 or more is passed through the pipe, the improvement comprising using a pipeline system in which the pipe or pipes in the at least one viscous polycarbonate passage region have no bent portion or not more than 50 bent portions in total, the bent portion being defined as a portion at which a central line longitudinally extending along the pipe exhibits a minimum or zero value with respect to a curvature radius of the central line, wherein the central line is defined as a line formed by connecting the centroids of the figures of inside cross-sections of the pipe, wherein the inside cross-sections are taken along planes perpendicular to the flow direction of a molten polycarbonate in the pipe and are defined by the aligned circumferences of the inner wall of the pipe, wherein, when the central line exhibits a minimum value with respect to the curvature radius thereof at the bent portion, the central line assumes an arc or a non-arc curve at the bent portion; and when the central line exhibits a zero value with respect to the curvature radius thereof at the bent portion, the central line assumes a corner at the bent portion.

For easy understanding of the present invention, the essential features and various preferred embodiments of the present invention are enumerated below.

1. In a method for producing an aromatic polycarbonate which comprises subjecting to a transesterification polymerization reaction at least one polymerizable material selected from the group consisting of:

a molten monomer mixture of an aromatic dihydroxy compound and a diaryl carbonate, and a molten prepolymer obtained by reacting an aromatic dihydroxy compound with a diaryl carbonate, the transesterification polymerization reaction being performed in one or more polymerizers which is or are connected through a pipeline system toward an outlet for a final aromatic polycarbonate product, wherein the pipeline system comprises one or more pipes through which a molten aromatic polycarbonate having a number average molecular weight increased by the transesterification polymerization reaction is passed while contacting an inner wall of the pipe or pipes, the pipeline system having at least one viscous polycarbonate passage region in which a molten aromatic polycarbonate having a number average molecular weight of 4,000 or more is passed through the pipe, the improvement comprising using a pipeline system in which the pipe or pipes in the at least one viscous polycarbonate passage region have no bent portion or not more than 50 bent portions in total, the bent portion being defined as a portion at which a central line longitudinally extending along the pipe exhibits a minimum or zero value with respect to a curvature radius of the central line, wherein the central line is defined as a line formed by connecting the centroids of the figures of inside cross-sections of the pipe, wherein the inside cross-sections are taken along planes perpendicular to the flow direction of a molten polycarbonate in the pipe and are defined by the aligned circumferences of the inner wall of the pipe, wherein, when the central line exhibits a minimum value with respect to the curvature radius thereof at the bent portion, the central line assumes an arc or a non-arc curve at the bent portion; and when the central line exhibits a zero value with respect to the curvature radius thereof at the bent portion, the central line assumes a corner at the bent portion.

2. The method according to item 1 above, wherein, when the pipe or pipes in the at least one viscous polycarbonate passage region have not more than 50 bent portions in total, substantially all of the bent portions satisfy the following formula (1):

$$R/L \geq 0.6 \tag{1}$$

wherein:

R represents the curvature radius (m) of the central line at the bent portion; and L represents the length (m) of the circumference of the figure of the inside cross-section of the pipe at the bent portion, or represents the smallest length (m) among the lengths of the circumferences of the figures of the inside cross-sections of the pipe at the bent portion when the lengths of the circumferences include different lengths.

3. The method according to item 1 or 2 above, wherein the pipe or pipes in the at least one viscous polycarbonate passage region have a total length of 50 m or less as measured along the central line.

4. The method according to item 1 or 2 above, wherein the molten aromatic polycarbonate is subjected to filtration by means of a polymer filter having a pore size corresponding to a filtration cut-off size of less than 1 μm, wherein the polymer filter is provided at least at one position in the pipeline system at which the conversion of the aromatic dihydroxy compound is in the range of from 5 to 90%.

5. The method according to item 3 above, wherein the molten aromatic polycarbonate is subjected to filtration by means of a polymer filter having a pore size corresponding to a filtration cut-off size of less than 1 μm, wherein the polymer filter is provided at least at one position in the pipeline system at which the conversion of the aromatic dihydroxy compound is in the range of from 5 to 90%.

6. An aromatic polycarbonate produced by the method of item 1 or 2 above.

7. An aromatic polycarbonate produced by the method of item 3 above.

8. An aromatic polycarbonate produced by the method of item 4 above.

9. An aromatic polycarbonate produced by the method of item 5 above.

Hereinbelow, the present invention will be described in more detail.

Conventionally, with respect to the problem that a polycarbonate produced by a melt transesterification process contains foreign matter as an impurity, the mechanisms of the occurrence of such foreign matter have not yet been elucidated, including whether it is generated during the reaction or it is inadvertently introduced through the raw materials or through the materials of the production equipment. It has been attempted to remove the foreign matter from the obtained polycarbonate by using a polymer filter. Also, conventionally, the occurrence of a discoloration has frequently been encountered in the production of an aromatic polycarbonate by a melt transesterification process, and it has been difficult to solve the discoloration problem.

However, the present inventors have for the first time found that both the occurrence of the discoloration problem and the occurrence of the foreign matter problem have a close relationship to the number of the bent portions of the pipe(s) in a viscous polycarbonate passage region of a pipeline system in which region a molten aromatic polycarbonate having a number average molecular weight of 4,000 or more is passed through the pipe, and that both the discoloration problem and the foreign matter problem can be solved by using a pipeline system in which the pipe(s) in the at least one viscous polycarbonate passage region have no bent portion or not more than 50 bent portions in total.

Complete elucidation of the mechanisms of the occurrence of the discoloration and foreign matter problems has not yet been made. However, in view of the fact that both the discoloration and foreign matter problems can be solved by using a pipeline system in which the pipe(s) in the at least one viscous polycarbonate passage region have no bent portion or have only a relatively small number of bent portions in total, wherein the bent portions are believed to tend to cause a local stagnation of a viscous molten polycarbonate, it is presumed that the discoloration and foreign matter problems occur when a molten polymer experiences stagnation during the passage thereof through the pipe(s) of a pipeline system.

In the present invention, the term "aromatic dihydroxy compound" means a compound represented by the following formula:

HO—Ar—OH wherein Ar represents a divalent aromatic group.

Preferred examples of divalent aromatic groups as Ar include a group represented by the following formula:

—Ar¹—Y—Ar²— wherein each of $Ar^1$ and $Ar^2$ independently represents a divalent carbocyclic or heterocyclic aromatic group having from 5 to 70 carbon atoms, and Y represents a divalent alkane group having from 1 to 30 carbon atoms.

In divalent aromatic groups $Ar^1$ and $Ar^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Illustrative examples of heterocyclic aromatic groups include an aromatic group having at least one hetero atom, such as a nitrogen atom, an oxygen atom or a sulfur atom.

Examples of divalent aromatic groups $Ar^1$ and $Ar^2$ include an unsubstituted or substituted phenylene group, an unsubstituted or substituted biphenylene group and an unsubstituted or substituted pyridylene group. Substituents for $Ar^1$ and $Ar^2$ are as described above.

Examples of divalent alkane group Y include organic groups respectively represented by the following formulae:

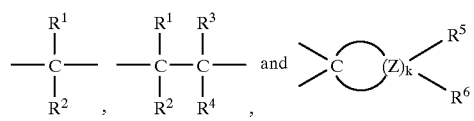

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl group having from 6 to 10 ring-forming carbon atoms; k represents an integer of from 3 to 11; each X represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms, wherein $R^5$ and $R^6$ are the same or different;

wherein at least one hydrogen atom of each of $R^1$, $R^2$, $R^3$, $R^4$, $R^5$ and $R^6$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Specific examples of divalent aromatic group Ar include groups respectively represented by the following formulae:

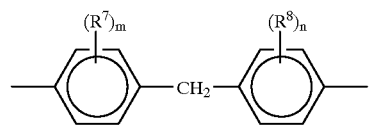

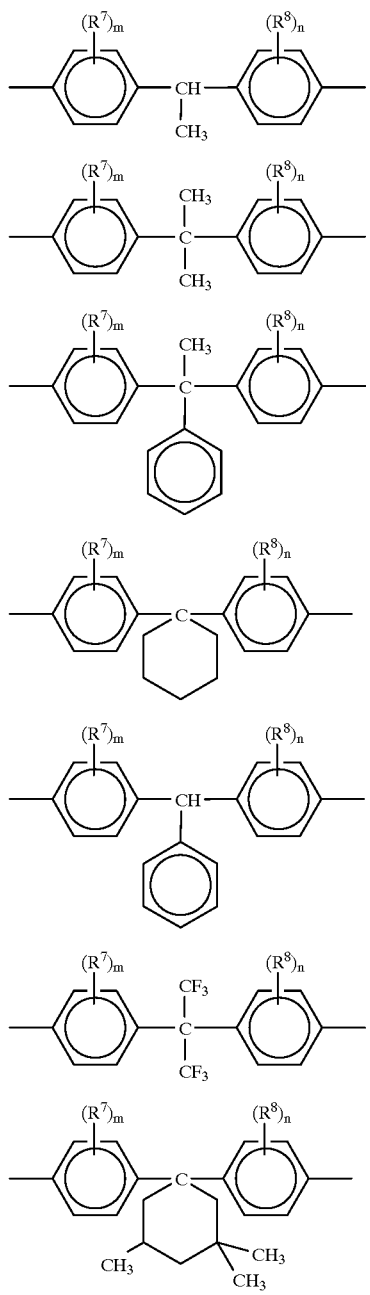

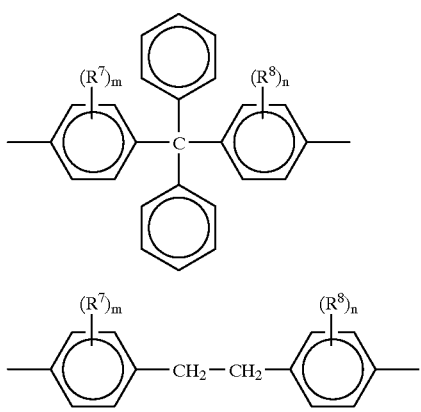

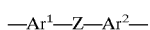

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, the $R^7$'s are the same or different, and when n is an integer of from 2 to 4, the $R^8$'s are the same or different.

Further, examples of divalent aromatic group Ar also include those which are represented by the following formula:

$$-Ar^1-Z-Ar^2-$$

wherein $Ar^1$ and $Ar^2$ are as defined above; and

Z represents a single bond or a divalent group, such as —O—, —CO—, —S—, —SO$_2$, —SO—, —COO—, or —CON($R^1$)—, wherein $R^1$ is as defined above.

Examples of divalent aromatic group Ar include groups respectively represented by the following formulae:

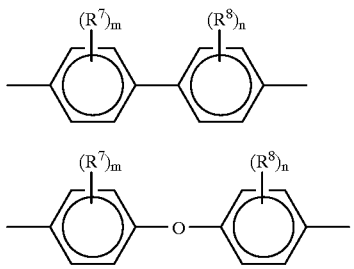

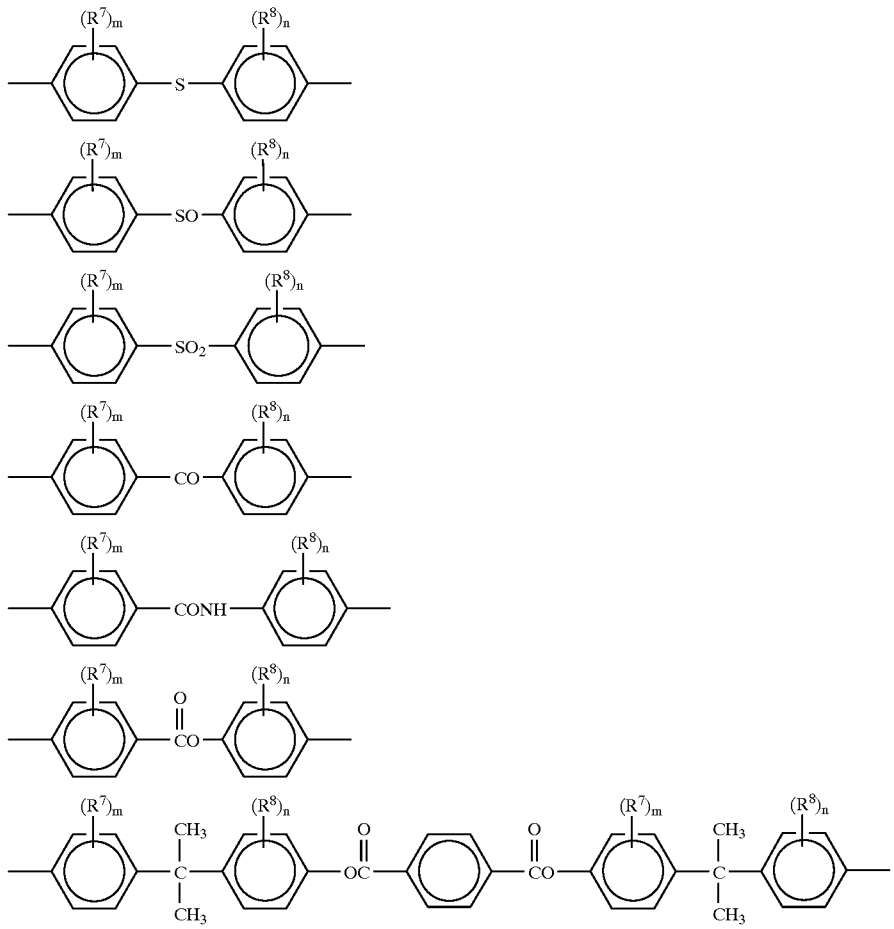

wherein $R^7$, $R^8$, m and n are as defined above.

Further examples of divalent aromatic group Ar include an unsubstituted or substituted phenylene, an unsubstituted or substituted naphthylene, and an unsubstituted or substituted pyridylene.

In the method of the present invention, the aromatic dihydroxy compounds can be used individually or in combination. Representative examples of aromatic dihydroxy compounds include bisphenol A.

The diaryl carbonate used in the present invention is represented by the following formula:

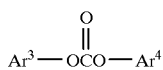

wherein each of $Ar^3$ and $Ar^4$ independently represents a monovalent aromatic group.

Each of $Ar^3$ and $Ar^4$ independently represents a monovalent carbocyclic or heterocyclic aromatic group. At least one hydrogen atom of each of $Ar^3$ and $Ar^4$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group.

Preferred examples of monovalent aromatic groups $Ar^3$ and $Ar^4$ are those respectively represented by the following formulae:

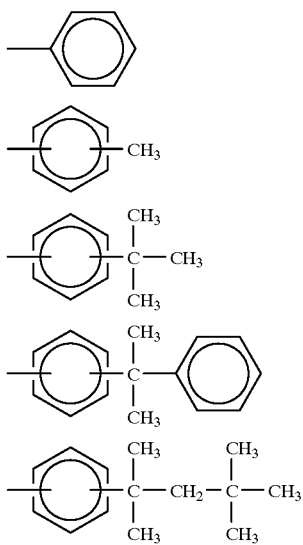

Representative examples of diaryl carbonates include an unsubstituted or substituted diphenyl carbonate compound represented by the following formula:

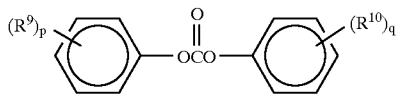

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, the $R^9$'s are the same or different, and when q is an integer of 2 or more, the $R^{10}$'s are the same or different.

Of these diphenyl carbonate compounds, preferred are diaryl carbonates having a symmetrical configuration, such as (unsubstituted) diphenyl carbonate and a diphenyl carbonate substituted with a lower alkyl group, e.g., ditolyl carbonate and di-t-butylphenyl carbonate. Particularly preferred is diphenyl carbonate, which is the diaryl carbonate having the simplest structure.

These diaryl carbonates may be used individually or in combination.

The ratio in which the aromatic dihydroxy compound and the diaryl carbonate are used (i.e., the charging ratio) may vary depending on the types of the aromatic dihydroxy compound and diaryl carbonate employed, the polymerization temperature and other polymerization conditions. The diaryl carbonate is generally used in an amount of from 0.9 to 2.5 moles, preferably from 0.95 to 2.0 moles, more preferably from 0.98 to 1.5 moles, per mole of the aromatic dihydroxy compound.

The number average molecular weight of the aromatic polycarbonate obtained according to the method of the present invention is generally from 5,000 to 100,000, preferably from 5,000 to 30,000.

In the present invention, the production of an aromatic polycarbonate is conducted by a transesterification process which is a process wherein a condensation polymerization of the polymerizable material is performed by transesterification in the molten state while heating in the presence or absence of a catalyst under reduced pressure, under an inert gas flow or under both reduced pressure and an inert gas flow. The mode of the polymerization equipment and the like are not specifically limited. Examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall polymerizer having a perforated plate, and a guide-wetting fall polymerizer having a perforated plate and at least one guide provided in association with the perforated plate. These various types of reactors can be used individually or in combination.

With respect to the various types of reactors or polymerizers mentioned above, especially a free-fall polymerizer having a perforated plate and a guide-wetting fall polymerizer having a perforated plate and at least one guide, reference can be made, for example, to U.S. Pat. No. 5,589,564 (in which a wire is used as the guide).

The term "guide" used in the present invention means a material which has an extremely large value in respect of the ratio of the length of the material to the average perimeter of a cross-section of the material which cross-section is taken in the direction perpendicular to the lengthwise direction of the material. With respect to the above ratio, there is no particular limitation, but it is generally from 10/1 to 1,000,000/1, preferably from 50/1 to 100,000/1.

With respect to the morphology of the cross-section of the guide (which cross-section is taken in the direction perpendicular to the lengthwise direction thereof), there is no particular limitation. Generally, the morphology of the cross-section of the guide is selected from a circle, an ellipse, a triangle, a quadrangle, a polygon, a star and the like. The morphology of the cross-section of the guide may be uniform or varying along the length of the guide. The guide may be hollow. The guide may be, for example, a wire or the like, and the wire or the like may be made of a single strand, or made of a plurality of strands, wherein, for example, the strands are twisted together. The surface of the guide may be smooth or jagged or may have projections locally. With respect to the type of the material of the guide, there is no particular limitation, but the material is generally selected from metals, such as stainless steel, carbon steel, Hastelloy, nickel, titanium, chromium and other alloys; and polymeric materials having high resistance to heat. The surface of the guide may, if desired, be treated with, for example, plating, lining, passivation, or washing with an acid or phenol.

With respect to the positional relationship between the at least one guide and the perforated plate, and to the positional relationship between the at least one guide and the at least one hole of the perforated plate, there is no particular limitation as long as a polymerizable material fed to a feeding zone of the guide-wetting fall polymerizer is enabled to pass downwardly through the perforated plate and fall along and in contact with the at least one guide toward the lower end of the at least one guide. The guide and the perforated plate either may be or may not be in contact with each other.

Explanation is made below on 4 examples of manners in which the guide is provided in correspondence with the hole of the perforated plate. However, the manner is not limited to the following 4 examples. In a first example, the upper end of the guide is secured to a support rod provided above the perforated plate, and the guide extends downwardly through the hole of the perforated plate. In a second example, the upper end of the guide is secured to the upper circumferential edge of the hole of the perforated plate, and the guide extends downwardly through the hole of the perforated plate. In a third example, the upper end of the guide is secured to the lower surface of the perforated plate, and the guide extends downwardly from the lower surface of the perforated plate. In a fourth example, the guide is attached to a support rod as described in the first example above, and the support rod having the guide attached thereto is provided not at a position above the perforated plate as in the first example, but at a position below the perforated plate. In the case of the fourth example, since the upper end of the guide is positioned below the perforated plate, a polymerizable material which has passed downwardly through the perforated plate freely falls before falling along and in contact with the guide.

In the method of the present invention, if desired, an extruder, a polymer mixer and the like may be employed in combination with the polymerizer(s) to be used, wherein any of the extruder, the polymer mixer and the like can be suitably used for adding additives, such as a stabilizer and the like, just after completion of the polymerization while the polycarbonate still remains in the molten state.

In the present invention, the transesterification polymerization reaction temperature is generally in the range of from 50 to 350° C., preferably from 150 to 290° C.

As the reaction proceeds, an aromatic monohydroxy compound is by-produced. By removing the aromatic monohydroxy compound from the reaction system, the reaction rate can be increased. Therefore, in the method of the present invention, it is preferable to employ a method in which an inert gas which does not adversely affect the reaction, such as nitrogen, argon, helium, carbon dioxide and a lower hydrocarbon gas, is introduced so that the by-produced aromatic monohydroxy compound is entrained by the inert gas, and the inert gas entraining the aromatic monohydroxy compound is withdrawn to remove the aromatic monohydroxy compound, or a method in which the reaction is carried out under reduced pressure. The above two methods can be used individually or in combination.

A suitable reaction pressure is selected depending on the molecular weight of the aromatic polycarbonate in the reaction system. When the number average molecular weight of the polycarbonate in the reaction system is less than 1,000, a reaction pressure in the range of from 50 mmHg to atmospheric pressure is generally employed. When the number average molecular weight of the polycarbonate in the reaction system is in the range of from 1,000 to 2,000, a reaction pressure in the range of from 3 mmHg to 80 mmHg is generally employed. When the number average molecular weight of the polycarbonate in the reaction system is more than 2,000, a reaction pressure of 10 mmHg or less, preferably 5 mmHg or less is generally employed.

The transesterification reaction can be carried out in the absence of a catalyst. However, if it is desired to accelerate the polymerization, the polymerization can be effected in the presence of a catalyst. The polymerization catalysts which are customarily used in the art can be used without particular limitation. Examples of such catalysts include hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an arylene group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1 R^2 R^3 R^4)$, and phosphonium borates represented by the formula: $(R^1 R^2 R^3 R^4)PB(R^1 R^2 R^3 R^4)$, wherein $R^1 R^2 R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalysts used is generally in the range of from $10^{-8}$ to 1% by weight, preferably from $10^{-7}$ to $10^{-1}$% by weight, based on the weight of the aromatic dihydroxy compound.

In the present invention, the term "molten aromatic polycarbonate" means not only a final, molten aromatic polycarbonate to be produced by the method of the present invention, but also a molten prepolymer which is a polycondensate obtained by a process of reacting an aromatic dihydroxy compound with a diaryl carbonate and which has a lower molecular weight than the molecular weight of the final aromatic polycarbonate.

As mentioned above, in the present invention, the transesterification polymerization reaction is performed in one or more polymerizers which is or are connected through a pipeline system toward an outlet for a final aromatic polycarbonate product. The pipeline system comprises one or more pipes through which a molten aromatic polycarbonate having a number average molecular weight increased by the transesterification polymerization reaction is passed while contacting an inner wall of the pipe or pipes. For example, the pipe or pipes are utilized: for transferring a molten aromatic polycarbonate from a polymerizer to another polymerizer; and for discharging the final aromatic polycarbonate to the outside of the polymerization system or any next stage or equipment, such as a polymer mixer, an extruder or the like, through an outlet while keeping the molten state of the final aromatic polycarbonate.

The pipeline system has at least one viscous polycarbonate passage region in which a molten aromatic polycarbonate having a number average molecular weight of 4,000 or more is passed through the pipe.

In the present invention, use is made of a pipeline system in which the pipe or pipes in the at least one viscous polycarbonate passage region have no bent portion or not more than 50 bent portions in total.

In the present invention, the term "bent portion" is defined as a portion at which a central line longitudinally extending along the pipe exhibits a minimum or zero value with respect to a curvature radius of the central line. The central line is defined as a line formed by connecting the centroids of the figures of inside cross-sections of the pipe, wherein the inside cross-sections are taken along planes perpendicular to the flow direction of a molten polycarbonate in the pipe and are defined by the aligned circumferences of the inner wall of the pipe. In FIG. 1, numeral 101 designates the internal space of the pipe, numeral 102 designates the flow direction of a molten polycarbonate in the pipe, numeral 103 designates an inside cross-section of the pipe, and numeral 104 designates the centroid of the figure of inside cross-section 103 of the pipe. For obtaining a central line by connecting the centroids of the figures of the inside cross-sections of the pipe, inside cross-sections of the pipe are taken at intervals of 10 mm as viewed in the longitudinal direction of the pipe. In forming a central line by connecting the centroids of the figures of inside cross-sections of the pipe, a smooth line is drawn.

In the present invention, when the central line exhibits a minimum value with respect to the curvature radius thereof at the bent portion, the central line assumes an arc or a non-arc curve at the bent portion.

Figure 3:
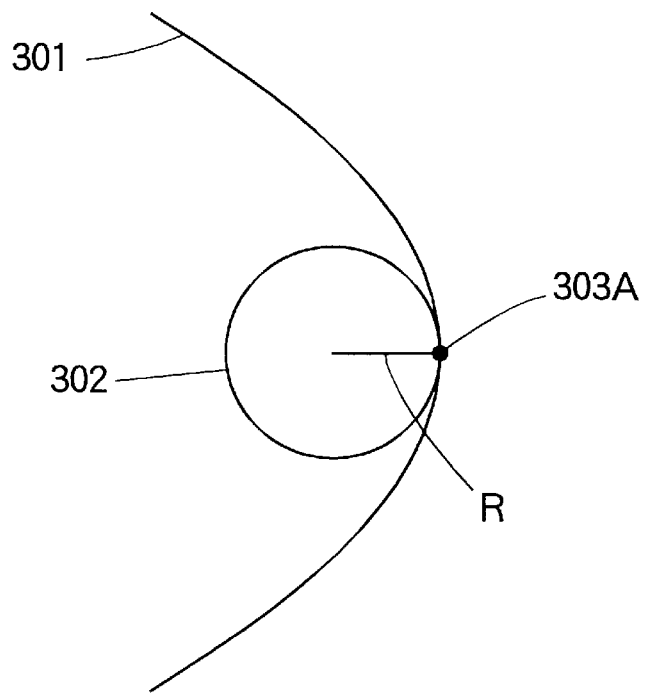
FIG. 3(a) is a diagrammatic explanatory view illustrating one example of a bent portion of a pipe, showing that a central line of the internal space of the pipe assumes a non-arc curve at the bent portion of the pipe.
FIG. 3(b) is a diagrammatic explanatory view illustrating another example of a bent portion of a pipe, showing that a central line of the internal space of the pipe assumes an arc at the bent portion of the pipe.
FIG. 3(c) is a diagrammatic explanatory view illustrating a further example of a bent portion of a pipe, showing that a central line of the internal space of the pipe assumes a corner at the bent portion of the pipe.
Figure 3:
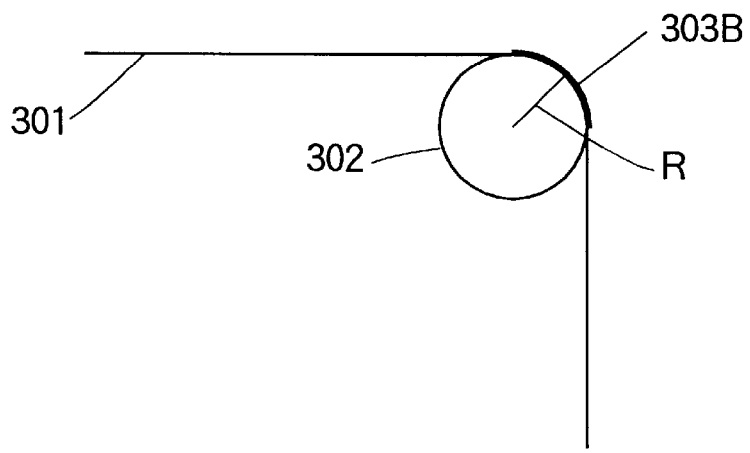
Figure 3:
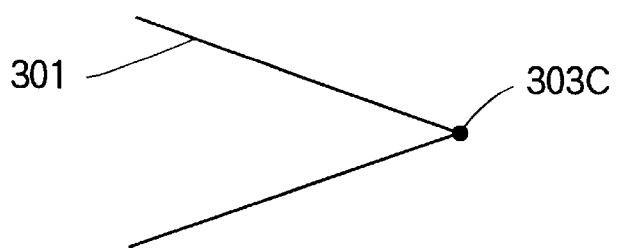

In the present invention, such an arc or a non-arc curve at the bent portion usually has a curvature radius of not larger than 5 m. FIG. 3(a) shows an example of central line 301 assuming a non-arc curve at the bent portion. FIG. 3(b) shows an example of central line 301 assuming an arc at the bent portion. As shown in FIGS. 3(a) and 3(b), with respect to central line 301 having specific, finite curvature radius R at a bent portion, either central line 301 contacts imaginary curvature circle 302 at point 303A on the circumference of curvature circle 302 {see FIG. 3(a) wherein the central line assumes a non-arc curve}, or central line 301 contacts imaginary curvature circle 302 along arc 303B which is a continuous piece of the circumference of curvature circle 302 {see FIG. 3(b) wherein the central line assumes an arc}. In the present invention, the term "arc" means a continuous piece of the circumference of a circle.

On the other hand, when the central line exhibits a zero value with respect to the curvature radius thereof at the bent portion, the central line assumes a corner at the bent portion. FIG. 3(c) shows an example of central line 301 assuming corner 303C at the bent portion.

When the curvature radius of the central line is infinitely large, the central line assumes a straight line, that is, the pipe has no bent portion.

With respect to each of the figures of the inside cross-sections of the pipe, there is no particular limitation, and each figure may be independently selected from, for example, various examples of figures shown in FIGS. 2(a) to 2(k) and FIG. 2(m).

As mentioned above, it is requisite that the pipe or pipes in the viscous polycarbonate passage region in the pipeline system have no bent portion or not more than 50 bent portions in total. In the method of the present invention, the pipe or pipes involved in the pipeline system are arranged toward an outlet (one outlet) for discharge of a final aromatic polycarbonate to the outside of the polymerization system, or to the next stage or equipment, such as a polymer mixer, an extruder or the like. When the viscous polycarbonate passage region has more than 50 bent portions, the foreign matter content of the produced aromatic polycarbonate cannot be satisfactorily reduced. It is preferred that the number of the bent portion(s) of the at least one viscous polycarbonate passage region is 40 or less, more advantageously 30 or less, most advantageously 0.

In the method of the present invention, when the pipe or pipes in the at least one viscous polycarbonate passage region have not more than 50 bent portions in total, from the viewpoint of effectively reducing the occurrence of the discoloration problem and the foreign matter problem with respect to the produced aromatic polycarbonate, it is preferred that substantially all of the bent portions satisfy the following formula (1):

$$R/L \geq 0.6 \qquad (1)$$

wherein:

R represents the curvature radius (m) of the central line at the bent portion; and L represents the length (m) of the circumference of the figure of the inside cross-section of the pipe at the bent portion, or represents the smallest length (m) among the lengths of the circumferences of the figures of the inside cross-sections of the pipe at the bent portion when the lengths of the circumferences include different lengths.

More specifically, when the pipe or pipes in the at least one viscous polycarbonate passage region have not more than 50 bent portions in total, it is preferred that 80% or more, more advantageously 90% or more, still more advantageously 95% or more of the bent portions satisfy the above formula (1).

It is more preferred that substantially all of the bent portions of the pipe or pipes in the viscous polycarbonate passage region satisfy the formula: $R/L \geq 0.8$, still more advantageously the formula: $R/L \geq 1.0$.

With respect to the mechanism in which the occurrence of the discoloration of the aromatic polycarbonate and the occurrence of foreign matter in the aromatic polycarbonate can be reduced by the method of the present invention, complete elucidation of the mechanism has not yet been made. However, it has been found that discoloration and extremely small foreign matter having a particle diameter of less than 1 μm are likely to occur in a molten aromatic polycarbonate during the passage of the polycarbonate through the pipe(s) in the viscous polycarbonate passage region of the pipeline system (in which region a molten aromatic polycarbonate having a number average molecular weight of 4,000 or more is passed through the pipe), especially when the polycarbonate is passed through bent portions of the pipe(s) in the viscous polycarbonate passage region. Further, it has also been found that such bent portions tend to cause the viscous molten aromatic polycarbonate to experience a prolonged, local stagnation. In view of these findings, it is presumed that, in the method of the present invention in which the number of the bent portion(s) of the viscous polycarbonate passage region is 0 or only not more than 50, a viscous molten polycarbonate can be effectively prevented from experiencing a stagnation in the pipe(s), leading to an effective suppression of the occurrence of the discoloration problem and the occurrence of the foreign matter problem in the produced aromatic polycarbonate.

In the present invention, the term "foreign matter" means a minute substance capable of scattering a laser beam. Examples of such minute substances include sand grains, particles of mineral substance, metal particles, particles of organic substance, and dust.

In the present invention, in addition to the viscous polycarbonate passage region, the pipeline system has also a less viscous polycarbonate passage region in which a molten aromatic polycarbonate having a number average molecular weight of less than 4,000 is passed through the pipe. With respect to the number of the bent portion(s) of the pipe(s) in such less viscous polycarbonate passage region, there is no particular limitation, but it is preferred the number of the bent portion(s) of the pipe(s) in the less viscous polycarbonate passage region is 0 or not more than 50.

In the present invention, it is preferred that the pipe or pipes in the viscous polycarbonate passage region have a total length of 100 m or less, more advantageously 50 m or less as measured along the central line.

In the present invention, it is preferred that the molten aromatic polycarbonate is subjected to filtration by means of a polymer filter having a pore size corresponding to a filtration cut-off size of less than 1 μm. In this case, it is also preferred that the polymer filter is provided at least at one position in the pipeline system at which the conversion of the aromatic dihydroxy compound is in the range of from 5 to 90%, more advantageously from 10 to 80%, especially advantageously from 20 to 75%.

The conversion of the aromatic dihydroxy compound is defined by the following formula (2):

$$\text{Conversion of the aromatic dihydroxy compound (\%)} = \frac{100 \times (E - F)}{E} \quad (2)$$

wherein E represents the weight (g) of the aromatic dihydroxy compound used as a monomer, and F represents the weight (g) of the unreacted aromatic dihydroxy compound remaining in the molten aromatic polycarbonate.

When the conversion of the aromatic dihydroxy compound is from 5 to 90% in a molten aromatic polycarbonate, the viscosity of the molten aromatic polycarbonate is relatively low. Such a low viscosity molten aromatic polycarbonate can be subjected to filtration by means of a polymer filter having a pore size corresponding to a filtration cut-off size of less than 1 μm without occurrence of a clogging of the polymer filter or like, so that there is no need for forcibly passing, under high pressure, the molten aromatic polycarbonate through the pipe(s), thereby enabling easy removal of extremely small foreign matter having a particle diameter of less than 1 μm. When the conversion of the aromatic dihydroxy compound in the molten aromatic polycarbonate is less than 5%, it is likely that a part of the aromatic dihydroxy compound, frequently still remaining undissolved in the molten aromatic polycarbonate to be subjected to filtration by means of a polymer filter, is disadvantageously removed by the polymer filter. Therefore, it is not preferred that a molten aromatic polycarbonate in which the conversion of the aromatic dihydroxy compound is less than 5% is subjected to filtration by means of a polymer filter. When the conversion of the aromatic dihydroxy compound in the molten aromatic polycarbonate is more than 90%, the viscosity of the molten aromatic polycarbonate is extremely high. When such an extremely high viscosity molten aromatic polycarbonate is subjected to filtration by means of a polymer filter having a pore size corresponding to a filtration cutoff size of less than 1 μm, a clogging of the polymer filter or like is likely to occur, so that it becomes necessary to forcibly pass, under high pressure, the molten aromatic polycarbonate through the pipe(s).

For removing extremely small foreign matter having a particle diameter of less than 1 μm from the molten aromatic polycarbonate, it is more preferred to use a polymer filter having a pore size corresponding to a filtration cut-off size of from 0.1 to 0.5 μm. Further, it is also preferred that foreign matter having a relatively large particle diameter is first removed from the molten aromatic polycarbonate by means of a polymer filter having a pore size corresponding to a filtration cut-off size of from 1 to 10 μm, and then foreign matter having a particle diameter of less than 1 μm is removed by means of a polymer filter having a pore size corresponding to a filtration cut-off size of from 0.1 to 0.5 μm.

A preferred embodiment of the method of the present invention, in which a vertical agitation polymerization, a free-fall polymerization and a guide-wetting fall polymerization are used in combination, is explained hereinbelow, referring to FIG. 4 of the accompanying drawings.

Figure 4:
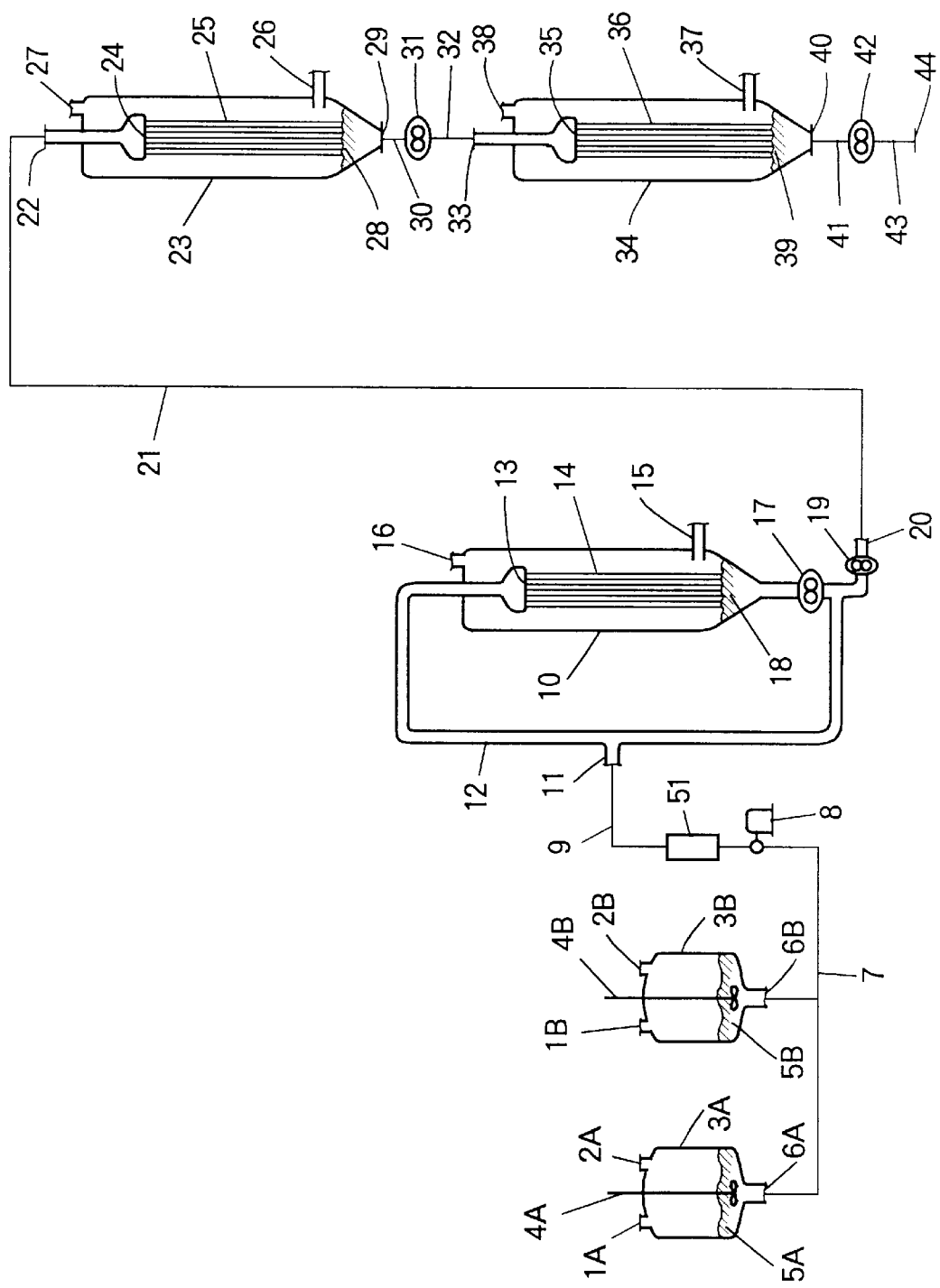
FIG. 4 is a diagram showing the system employed for producing an aromatic polycarbonate in Example 1.

FIG. 4 shows a system for practicing one mode of the method of the present invention. In the system of FIG. 4, two polymerizers are used in the agitation polymerization, one polymerizer is used in the free-fall polymerization and two polymerizers are used in the guide-wetting fall polymerization, but the system of FIG. 4 is merely an example and should not be construed as limiting the scope of the present invention.

When the system of FIG. 4 is used, at least one polymerizable material selected from the group consisting of a molten monomer mixture of an aromatic dihydroxy compound and a diaryl carbonate, and a molten prepolymer obtained by reacting an aromatic dihydroxy compound with a diaryl carbonate is introduced to vertical agitation type polymerizer vessels 3A and 3B, respectively, through inlet 1A of polymerizer 3A and inlet 1B of polymerizer 3B. Agitation type polymerizer vessels 3A and 3B have vertical agitators 4A and 4B, respectively. Agitation type polymerizer vessels 3A and 3B are the same, and are adapted to be alternately operated when, for example, it is intended to produce a molten prepolymer in a batchwise manner by means of each of these polymerizer vessels 3A and 3B. Each of polymerizer vessels 3A and 3B is filled with an inert gas, such as nitrogen, and the internal pressure of each polymerizer is usually controlled to a level around atmospheric pressure. A by-produced and evaporated aromatic monohydroxy compound and the like are discharged from polymerizer vessels 3A and 3B, respectively, through vents 2A and 2B. Molten polymers 5A and 5B, obtained by the polymerization for a predetermined reaction time under agitation in respective polymerizer vessels 3A and 3B, are discharged through outlets 6A and 6B, respectively. At this point in time, with respect to each of molten polymers 5A and 5B, the conversion of the aromatic dihydroxy compound is in the range of from 5 to 90%, and the number average molecular weight thereof is less than 4,000. Molten polymers 5A and 5B discharged through outlets 6A and 6B, respectively, are transferred by means of transfer pump 8 through pipe 7, polymer filter 51 and pipe 9, wherein polymer filter 51 has a pore size corresponding to a filtration cut-off size of less than 1 μm and hence can remove foreign matter having a particle diameter of 1 μm or less contained in the molten polymer (i.e., molten polymer 5A or 5B or a mixture of molten polymers 5A and 5B). The molten polymer which has flowed through pipe 9 is then introduced to free-fall polymerizer 10 having perforated plate 13 through inlet 11 and recirculation line 12.

That is, in the free-fall polymerization, the molten polymer, which has been obtained by agitation polymerization in one or both of agitation type polymerizer vessels 3A and 3B and has been subjected to filtration by means of polymer filter 51, is continuously fed to free-fall polymerizer 10 at its introduction zone (having perforated plate 13) through inlet 11 provided in recirculation line 12, and allowed to pass through perforated plate 13 and fall freely through a free-fall polymerization reaction zone in free-fall polymerizer 10. Molten polymer 14 falls freely in the form of a filament or the like. The internal pressure of polymerizer 10 is maintained at a predetermined level. A by-produced and evaporated aromatic monohydroxy compound and the like, and an inert gas, such as nitrogen, which is optionally fed through gas feed port 15, are discharged through vent 16. The resultant molten polymer obtained at the bottom of the free-fall polymerization reaction zone is recirculated through recirculation line 12 (having recirculation pump 17) to the introduction zone having perforated plate 13, and allowed to pass through perforated plate 13 and fall freely through the free-fall polymerization reaction zone in the free-fall polymerizer, thereby increasing the degree of polymerization of the recirculated molten polymer during the free-fall thereof. Resultant molten polymer 18 having a predetermined degree of polymerization is continuously withdrawn through outlet 20, by means of transfer pump 19. The number average molecular weight of molten polymer 18 is still less than 4,000.

Molten polymer 18 is fed, through pipe 21 and inlet 22, to first guide-wetting fall polymerizer 23 having perforated plate 24 and wire 25, wherein wire 25 serves as a guide.

That is, in the first guide-wetting fall polymerization, molten polymer 18, obtained by free-fall polymerization in free-fall polymerizer 10, is continuously fed to first guide-wetting fall polymerizer 23 at its feeding zone (having perforated plate 24) through inlet 22, and allowed to pass downwardly through perforated plate 24 and fall along and in contact with wire 25 through a guide-wetting fall polymerization reaction zone in first guide-wetting fall polymerizer 23. The internal pressure of the polymerizer is maintained at a predetermined level. A by-produced and evaporated aromatic monohydroxy compound and the like, and an inert gas, such as nitrogen, which is optionally fed through gas feed port 26, are discharged through vent 27. Resultant molten polymer 28 obtained at the bottom of the guide-wetting fall polymerization reaction zone has a number average molecular weight of less than 4,000 or 4,000 or more. Molten polymer 28 is continuously withdrawn through outlet 29, and is transferred by means of transfer pump 31 through pipes 30 and 32, and fed to second guide-wetting fall polymerizer 34 (having perforated plate 35 and wire 36) at its feeding zone (having perforated plate 35) through inlet 33, and allowed to pass downwardly through perforated plate 35 and fall along and in contact with wire 36 through a guide-wetting fall polymerization reaction zone in second guide-wetting fall polymerizer 34. The internal pressure of the polymerizer is maintained at a predetermined level. A by-produced and evaporated aromatic monohydroxy compound and the like, and an inert gas, such as nitrogen, which is optionally fed through gas feed port 37, are discharged through vent 38. Resultant molten polymer 39, obtained at the bottom of the guide-wetting fall polymerization reaction zone, is discharged by means of discharge pump 42 through outlet 40, pipe 41 and pipe 43, and withdrawn through withdrawal port 44.

In the present invention, it is requisite that the number of the bent portion(s) in pipes 30, 32, 41 and 43 of FIG. 4 be 0 or not more than 50. It is preferred that the number of the bent portion(s) in pipes 30, 32, 41 and 43 of FIG. 4 is 40 or less, more advantageously 30 or less, most advantageously 0. When pipes 30, 32, 41 and 43 of FIG. 4 have not more than 50 bent portions in total, it is preferred that 80% or more, more advantageously 90% or more, still more advantageously 95% or more of the bent portions satisfy the above formula (1) (R/L ratio≧0.6). When pipes 30, 32, 41 and 43 of FIG. 4 have not more than 50 bent portions in total, it is most preferred that each bent portion in pipes 30, 32, 41 and 43 of FIG. 4 satisfies the above formula (1) (R/L ratio≧0.6).

With respect to each of the agitation, free-fall and guide-wetting fall polymerizations, all of the polymerizers, recirculation lines, transfer lines, discharge lines and the like are heated to and kept at an elevated temperature by means of a jacket, a heater or the like.

In the present invention, for adding an additive to an aromatic polycarbonate and kneading the resultant mixture, it is preferred that an extruder or the like is directly connected to withdrawal port 44. For further reducing the amount of foreign matter in the polycarbonate, it is also preferred a polymer filter is provided to the extruder.

With respect to the material for the pipe(s), there is no particular limitation. The material for the pipe(s) is generally selected from stainless steel, nickel, glass and the like.

Further, with respect to the morphology and size of the hollow portions (internal space) of the pipe(s), there is no particular limitation as long as the pipe or pipes in the viscous polycarbonate passage region of the pipeline system have no bent portion or not more than 50 bent portions. It is preferred that the morphology and size of the hollow portions of the pipe(s) are selected so that the molten aromatic polycarbonate does not experience a stagnation in the pipe (s).

BEST MODE FOR CARRYING OUT THE INVENTION

The present invention will now be further illustrated in more detail with reference to the following Examples and Comparative Examples, which should not be construed as limiting the scope of the present invention.

In the following Examples and Comparative Examples, various properties were measured and evaluated as follows.
(1) Measurement of the number average molecular weight ( $\overline{M}n$ ) of an aromatic polycarbonate:

The number average molecular weight of the produced aromatic polycarbonate was measured by gel permeation chromatography (GPC) (column: TSK-GEL, manufactured and sold by Tosoh Corp., Japan; solvent: tetrahydrofuran), utilizing the molecular weight conversion calibration curve obtained with respect to standard polystyrene samples each having a single molecular weight distribution, which calibration curve was obtained by the following formula:

$$M_{pc} = 0.3591 M_{PS}^{1.0388}$$

wherein $M_{pc}$ represents the molecular weight of the polycarbonate, and $M_{ps}$ represents the molecular weight of the standard polystyrene.
(2) Evaluation of the color of a polycarbonate:

The color of a polycarbonate was evaluated, using a test specimen having a width of 50 mm, a length of 50 mm and a thickness of 3.2 mm, in accordance with the CIELAB method (Commission Internationale de l' Eclairage 1976 L*a*b* Diagram), wherein the test specimen was obtained by a method in which a polycarbonate is subjected to continuous molding, using an injection molding machine (JLOOE, manufactured and sold by THE JAPAN STEEL WORKS. LTD., Japan), at a cylinder temperature of 300° C. and a mold temperature of 90° C. The yellowness of the specimen was expressed in terms of the b*-value.
(3) Measurement of the amount of foreign matter contained in an aromatic polycarbonate:

The content of the foreign matter (having an average particle diameter of from 0.5 to 1.0 μm) contained in the produced aromatic polycarbonate was measured by means of HIAC/ROYCO MODEL 346B (manufactured and sold by Pacific Scientific Ltd., England).

The measurement was conducted with respect to a solution of the aromatic polycarbonate in methylene chloride.
(4) Measurement of the conversion (%) of the aromatic dihydroxy compound in an aromatic polycarbonate:

An aromatic polycarbonate was subjected to high performance liquid chromatography (HPLC) measurement to determine the amount of an unreacted aromatic dihydroxy compound in the aromatic polycarbonate. The conversion (%) of the aromatic dihydroxy compound was calculated by formula (2) above, using the measured amount of the unreacted aromatic dihydroxy compound and the amount of the aromatic dihydroxy compound charged to a reaction system for producing the aromatic polycarbonate.

EXAMPLE 1

An aromatic polycarbonate was produced by melt transesterification in accordance with a system as shown in FIG. 4. The system of FIG. 4 comprises an agitation polymerization, a free-fall polymerization is and a guide-wetting fall polymerization.

In the agitation polymerization, use was made of agitation type polymerizer vessels 3A and 3B (each having a capacity of 200 liters) which are equipped with agitators 4A and 4B, respectively, each having anchor-type agitating blades.

In the free-fall polymerization, free-fall polymerizer 10 was used. Free-fall polymerizer 10 is equipped with perforated plate 13 which has 50 holes having a diameter of 7 mm. The free-fall distance is 8 m.

In the guide-wetting fall polymerization, use was made of first and second wire-wetting fall polymerizers 23 and 34 in each of which a wire is used as a guide. First and second wire-wetting fall polymerizers 23 and 34 are equipped with perforated plates 24 and 35, respectively, each having 50 holes having a diameter of 5 mm. In first wire-wetting fall polymerizer 23, 50 strands of 1 mm$\phi$ SUS316 wires 25 are hung vertically from the respective holes of perforated plate 24 to a reservoir portion at the bottom of first wire-wetting fall polymerizer 23 so that a polymerizable material will not fall freely (not free-fall) but fall along and in contact with the wires (wire-wetting fall). Also, in second wire-wetting fall polymerizer 34, 50 strands of 1 mm$\phi$ SUS316 wires 36 are hung vertically from the respective holes of perforated plate 35 to a reservoir portion at the bottom of second wire-wetting fall polymerizer 34 so that a polymerizable material will not fall freely (not free-fall) but fall along and in contact with the wires (wire-wetting fall). In each of first and second wire-wetting fall polymerizers 23 and 34, the wire-wetting fall distance is 8 m.

The agitation polymerization in each of agitation type polymerizer vessels 3A and 3B was batchwise conducted, whereas the free-fall polymerization in free-fall polymerizer 10 and the wire-wetting fall polymerization in first and second wire-wetting fall polymerizers 23 and 34 were continuously conducted.

The polymerization reaction conditions in each of agitation type polymerizer vessels 3A and 3B were as follows: the reaction temperature was 180° C., the reaction pressure was atmospheric pressure, and the flow rate of nitrogen gas was 1 liter/hr.

In operation, 80 kg of a monomer mixture of bisphenol A as an aromatic dihydroxy compound and diphenyl carbonate as a diaryl carbonate (the molar ratio of diphenyl carbonate to bisphenol A: 1.10) was charged into each of agitation type polymerizer vessels 3A and 3B. The monomer mixture in polymerizer vessel 3A was polymerized in a molten state for 4 hours while agitating to obtain molten polymer 5A. Outlet 6A was opened, and molten polymer 5A was continuously fed by means of feed pump 8, through polymer filter 51, to free-fall polymerizer vessel 10 at a flow rate of 10 liters/hr.

While feeding molten prepolymer 5A obtained in agitation type polymerizer vessel 3A to free-fall polymerizer vessel 10, agitation type polymerizer vessel 3B was operated to polymerize the monomer mixture of bisphenol A and diphenyl carbonate in the same manner as in the agitation polymerization in agitation type polymerizer vessel 3A, to obtain molten prepolymer 5B.

When agitation type polymerizer vessel 3A became empty, outlet 6A of polymerizer 3A was closed and, instead, outlet 6B of polymerizer 3B was opened, so that molten polymer 5B was fed by means of transfer pump 8 from agitation type polymerizer vessel 3B, through polymer filter 51, to free-fall polymerizer 10 at a flow rate of 10 liters/hr. In this instance, the same monomer mixture of bisphenol A and diphenyl carbonate as mentioned above was charged in polymerizer 3A. While feeding molten polymer 5B obtained in agitation type polymerizer vessel 3B to free-fall polymerizer vessel 10, polymerizer vessel 3A was operated, so that the monomer mixture charged therein was polymerized in the same manner as mentioned above.

With respect to the batchwise polymerization in agitation type polymerizer vessels 3A and 3B and to the alternate feedings of molten polymers 5A and 5B from polymerizer vessels 3A and 3B to free-fall polymerizer 10, the same operation as mentioned above was repeated, so that the molten polymer (either molten polymer 5A or molten polymer 5B, alternately) was continuously fed by means of pump 8, through polymer filter 51, to free-fall polymerizer 10. Polymer filter 51 comprises a combination of a polymer filter having a pore size corresponding to a filtration cut-off size of 5 $\mu$m and a polymer filter having a pore size corresponding to a filtration cut-off size of 0.3 $\mu$m. With respect to the molten polymer fed to free-fall polymerizer 10, the conversion of bisphenol A is 73%.

In free-fall polymerizer 10, a free-fall polymerization of molten polymers 5A and 5B, alternately fed from agitation type polymerizer vessels 3A and 3B, was continuously carried out under polymerization reaction conditions wherein the reaction temperature was 235° C. and the reaction pressure was 10 mmHg, thereby obtaining molten polymer 18, while recirculating a part of obtained molten polymer 18 to the introduction zone (having perforated plate 13) of free-fall polymerizer 10 through recirculation line 12 at a recirculation rate of 400 liters/hr.

When the volume of molten polymer 18 at the bottom of free-fall polymerizer 10 reached 20 liters, part of molten polymer 18 was continuously fed to first wire-wetting fall polymerizer 23 so that the volume of molten polymer 18 in free-fall polymerizer 10 was constantly maintained at 20 liters. Molten polymer 18 to be fed to first wire-wetting fall polymerizer 23 has a number average molecular weight of less than 4,000.

In first wire-wetting fall polymerizer 23, a wire-wetting fall polymerization reaction was continuously carried out under polymerization reaction conditions wherein the reaction temperature was 250° C., the reaction pressure was 1 mmHg and the flow rate of nitrogen gas was 2 liters/hr, thereby obtaining molten polymer 28. Molten polymer 28 obtained at the bottom of first wire-wetting fall polymerizer 23 has a number average molecular weight of less than 4,000 or 4,000 or more.

When the volume of molten polymer 28 at the bottom of first wire-wetting fall polymerizer 23 reached 20 liters, molten polymer 28 was continuously transferred by means of transfer pump 31 from first wire-wetting fall polymerizer 23 to second wire-wetting fall polymerizer 34 through outlet 29 and pipes 30 and 32 so that the volume of molten polymer 28 in first wire-wetting fall polymerizer 23 was constantly maintained at 20 liters.

In second wire-wetting fall polymerizer 34, a wire-wetting fall polymerization reaction was continuously carried out under polymerization reaction conditions wherein the reaction temperature was 260° C. and the reaction pressure was 0.4 mmHg, thereby obtaining molten polymer 39.

When the volume of molten polymer 39 at the bottom of second wire-wetting fall polymerizer 34 reached 20 liters, molten polymer 39 was continuously discharged by means of discharge pump 42 from second wire-wetting fall polymerizer 34 through outlet 40 and pipes 41 and 43 and withdraw through withdrawal port 44 so that the volume of molten polymer 39 in second wire-wetting fall polymerizer 34 was constantly maintained at 20 liters.

Pipes 30, 32, 41 and 43 constitute the viscous polycarbonate passage regions of the pipeline system. Pipes 30, 32, 41 and 43 have no bent portion as defined in the present invention. Each of pipes 30, 32, 41 and 43 is straight, and is disposed vertically. The total length of these pipes 30, 32, 41 and 43 is 7 m as measured along the central line of the pipes.

The above-mentioned series of polymerization reactions was continuously carried out for 300 hours. Samples were taken from the molten polymers which were individually withdrawn from free-fall polymerizer 10, first wire-wetting fall polymerizer 23 and second wire-wetting fall polymerizer 34 at a time point of 300 hours after the start of the polymerization reaction, and these samples had $\overline{M}n$ values of 2,100, 5,900 and 10,100, respectively.

After 300 hours from the start of the polymerization operation, the strand withdrawn from second wire-wetting fall polymerizer 34 through withdrawal port 44 was cut into pellets by means of a strand cutter. With respect to the obtained aromatic polycarbonate pellets, various evaluations were made in accordance with the above-mentioned methods. As a result, the b* value of the aromatic polycarbonate was as small as 3.1, and the amount of foreign matter (having a particle diameter of from 0.5 to 1.0 µm) was only 580 pieces per gram of the aromatic polycarbonate.

Further, even after 1,000 hours from the start of the polymerization operation, no increase was observed in the feeding pressure of feed pump 8 due to clogging of polymer filter 51 with foreign matter.

EXAMPLES 2 TO 16

Substantially the same procedure as in Example 1 was repeated, except that pipes 30, 32, 41 and 43 were caused to have bent portions as shown in Table 1. The Mn values of the molten polymers which were individually withdrawn from free-fall polymerizer 10, first guide-wetting fall polymerizer 23 and second guide-wetting fall polymerizer 34 (as measured 300 hours after the start of the operation of the system of FIG. 4) were the same as those in Example 1. With respect to the aromatic polycarbonate withdrawn from second guide-wetting fall polymerizer 34 after 300 hours from the start of the operation of the system of FIG. 4, the b* value thereof and the amount of foreign matter (having a particle diameter of 0.5 to 1.0 µm) contained therein were measured in accordance with the above-mentioned methods. The results are shown in Table 1.

COMPARATIVE EXAMPLES 1 TO 3

Substantially the same procedure as in Example 1 was repeated, except that pipes 30, 32, 41 and 43 were caused to have bent portions as shown in Table 1. The $\overline{M}n$ values of the molten polymers which were individually withdrawn from free-fall polymerizer 10, first guide-wetting fall polymerizer 23 and second guide-wetting fall polymerizer 34 (as measured 300 hours after the start of the operation of the system of FIG. 4) were the same as those in Example 1. With respect to the aromatic polycarbonate withdrawn from second guide-wetting fall polymerizer 34 after 300 hours from the start of the operation of the system of FIG. 4, the b* value thereof and the amount of foreign matter (having a particle diameter of 0.5 to 1.0 µm) contained therein were measured in accordance with the above-mentioned methods. The results are shown in Table 1.

COMPARATIVE EXAMPLE 4

Substantially the same procedure as in Comparative Example 3 was repeated, except that a polymer filter having a pore size corresponding to a filtration cutoff size of 0.3 µm was disposed just downstream of withdrawal port 44, relative to the flow direction of the molten polymer.

After 80 hours from the start of the polymerization operation, a large increase occurred in the discharge pressure of discharge pump 42 due to clogging of the polymer filter disposed just downstream of withdrawal port 44, so that the polymerization operation could not be continued.

EXAMPLE 17

Figure 5:
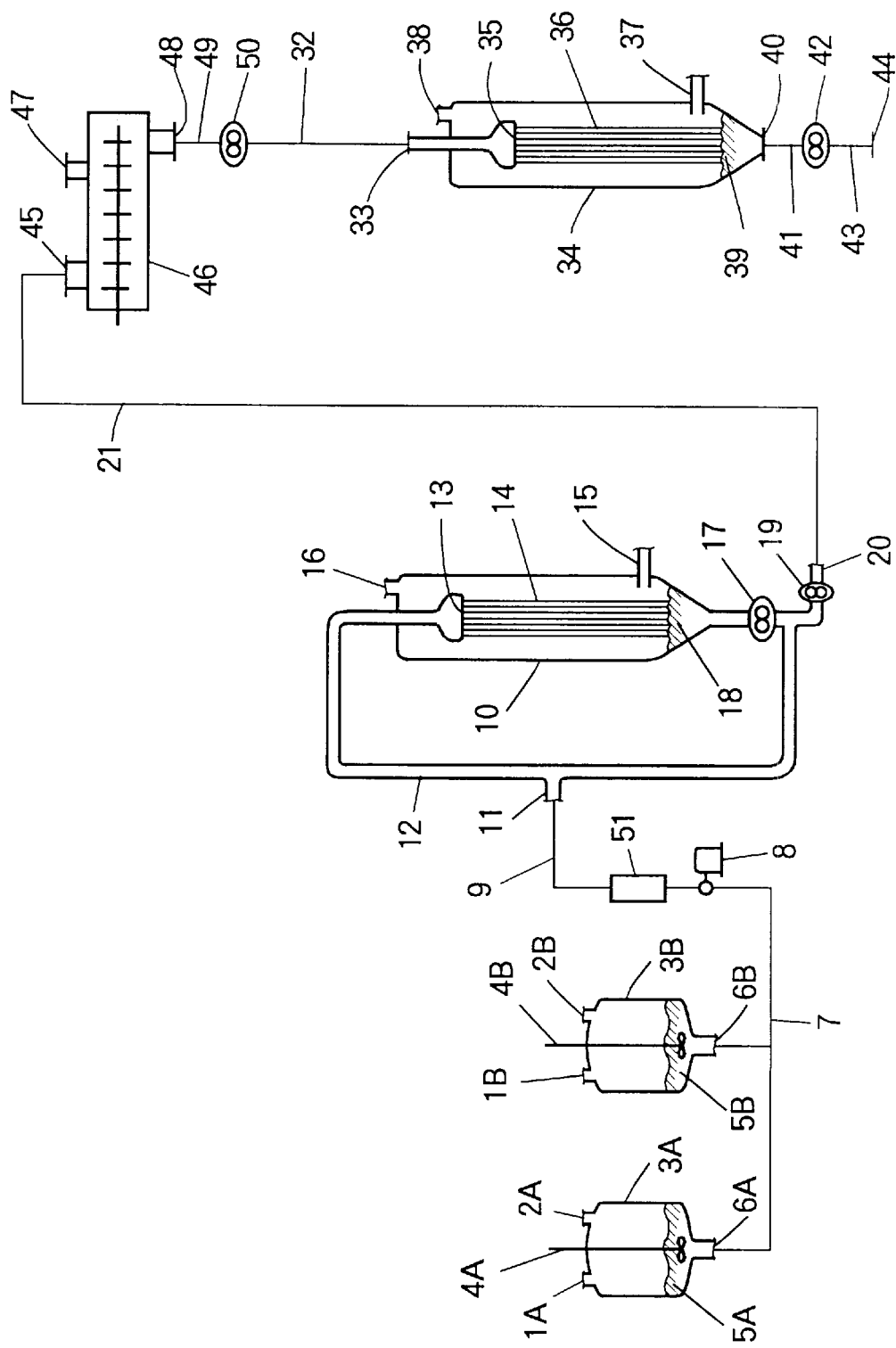
FIG. 5 is a diagram showing the system employed for producing an aromatic polycarbonate in Example 17.

An aromatic polycarbonate was produced by melt transesterification in accordance with a system as shown in FIG. 5. The system of FIG. 5 is substantially the same as that of FIG. 4, except that, instead of first guide-wetting fall polymerizer 23, horizontal twin-screw agitation type polymerizer 46 is used.

The polymerization reaction conditions in each of agitation type polymerizer vessels 3A and 3B, free-fall polymerizer 10 and guide-wetting fall polymerizer 34 were the same as in Example 1.

Horizontal twin-screw agitation type polymerizer 46 has a capacity of 30 liters and an L/D ratio of 6, and is equipped with a twin-screw agitator having a rotation diameter of 140 mm. The polymerization reaction conditions in horizontal twin-screw agitation type polymerizer 46 were as follows: the reaction temperature was 265° C., and the reaction pressure was 0.8 mmHg. When the volume of the molten polymer in horizontal twin-screw agitation type polymerizer 46 reached 10 liters, it was started to feed the molten polymer to guide-wetting fall polymerizer 34 by means of gear pump 50. The feeding rate of the molten polymer to polymerizer 34 was controlled so that the volume of the molten polymer in horizontal twin-screw agitation type polymerizer 46 was constantly maintained at 10 liters.

Pipes 32, 41, 43 and 49 constitute the viscous polycarbonate passage regions of the pipeline system. Pipes 32, 41, 43 and 49 have no bent portion. Specifically, each of pipes 32, 41, 43 and 49 is straight. Further, these pipes are disposed vertically. The total length of these pipes 32, 41, 43 and 49 is 8 m as measured along the central line of the pipes.

Samples were taken from the molten polymers which were individually withdrawn from free-fall polymerizer 10, horizontal twin-screw agitation type polymerizer 46 and guide-wetting fall polymerizer 34 at a time point of 300 hours after the start of the polymerization reaction, and these samples had $\overline{M}n$ values of 2,100, 5,200 and 9,500, respectively.

After 300 hours from the start of the polymerization operation, the strand withdrawn from guide-wetting fall polymerizer 34 through withdrawal port 44 was cut into pellets by means of a strand cutter. With respect to the obtained aromatic polycarbonate pellets, various evaluations were made in accordance with the above-mentioned methods. As a result, the b* value of the aromatic polycarbonate was as small as 3.4, and the amount of foreign matter (having a particle diameter of from 0.5 to 1.0 μm) was only 1,840 pieces per gram of the aromatic polycarbonate.

EXAMPLE 18

Substantially the same procedure as in Example 1 was repeated, except that the reaction pressure in first guide-wetting fall polymerizer 23 was changed to 2.5 mmHg so as to cause molten polymer 28 obtained at the bottom of first guide-wetting fall polymerizer 23 to have a number average molecular weight of less than 4,000. That is, in Example 18, pipes 30 and 32 of FIG. 4 do not constitute a viscous polycarbonate passage region.

Pipes 41 and 43 constitute the viscous polycarbonate passage regions. Pipes 41 and 43 have no bent portion. Each of pipes 41 and 43 is straight and is disposed vertically. The total length of pipes 41 and 43 is 2.5 m as measured along the central line of the pipes.

On the other hand, pipes 30 and 32 (which do not constitute a viscous polycarbonate passage region in Example 18) have bent portions. In pipes 30 and 32, the number of the bent portions satisfying the formula: R/L=1.0 is 38, and the number of the bent portions satisfying the formula: R/L=0.5 is 16, and pipes 30 and 32 have 54 bent portions in total. The total length of pipes 30 and 32 is 6.5 m as measured along the central line of the pipes.

Samples were taken from the molten polymers which were individually withdrawn from free-fall polymerizer 10, first guide-wetting fall polymerizer 23 and second guide-wetting fall polymerizer 34 at a time point of 300 hours after the start of the polymerization reaction, and these samples had $\overline{Mn}$ values of 2,100, 3,800 and 7,900, respectively.

After 300 hours from the start of the polymerization operation, the strand withdrawn from second guide-wetting fall polymerizer 34 through withdrawal port 44 was cut into pellets by means of a strand cutter. With respect to the obtained aromatic polycarbonate pellets, various evaluations were made in accordance with the above-mentioned methods. As a result, the b* value of the aromatic polycarbonate was as small as 3.6, and the amount of foreign matter (having a particle diameter of from 0.5 to 1.0 μm) was only 2,710 pieces per gram of the aromatic polycarbonate.

The results of Example 18 show that, even when the pipes of the pipeline system as a whole have more than 50 bent portions, the excellent effects of the present invention can be achieved as long as the pipeline system satisfies the requirement that the pipe or pipes in the viscous polycarbonate passage region have 0 or not more than 50 bent portions in total.

EXAMPLE 19

Substantially the same procedure as in Example 1 was repeated, except that polymer filter 51 was not used. The $\overline{Mn}$ values of the molten polymers which were individually withdrawn from free-fall polymerizer 10, first guide-wetting fall polymerizer 23 and second guide-wetting fall polymerizer 34 (as measured 300 hours after the start of the operation of the system of FIG. 4) were the same as those in Example 1.

With respect to the aromatic polycarbonate withdrawn from second guide-wetting fall polymerizer 34 after 300 hours from the start of the operation of the system of FIG. 4, the b* value thereof and the amount of foreign matter (having a particle diameter of 0.5 to 1.0 μm) contained therein were measured in accordance with the above-mentioned methods. As a result, the b* value of the aromatic polycarbonate was as small as 3.1, and the amount of foreign matter (having a particle diameter of from 0.5 to 1.0 μm) was only 3,050 pieces per gram of the aromatic polycarbonate.

TABLE 1

| Examples and Comparative Examples | Number of bent portion satisfying the formula: R/L ≧ 0.6[1] in pipes 30, 32, 41 and 43[4] | | Number of bent portion satisfying the formula: R/L < 0.6[1] in pipes 30, 32, 41 and 43[4] | | Evaluation of color of an aromatic polycarbonate (b* value) | Amount of foreign matter having a particle diameter of 0.5 to 1.0 μm in an aromatic polycarbonate (piece/g) |
|---|---|---|---|---|---|---|
| | Value of R/L[1] ratio | Number of bent portion | Value of R/L[1] ratio | Number of bent portion | | |
| Example 1 | — | 0 | — | 0 | 3.1 | 580 |
| Example 2 | 1.0 | 4 | — | 0 | 3.2 | 590 |
| Example 3 | 1.0 | 10 | — | 0 | 3.3 | 750 |
| Example 4 | 1.0 | 25 | — | 0 | 3.5 | 840 |
| Example 5 | 1.0 | 40 | — | 0 | 3.5 | 1,850 |
| Example 6 | 1.0 | 50 | — | 0 | 3.5 | 2,870 |
| Example 7 | 1.0 | 48 | 0.4 | 2 | 3.6 | 3,170 |
| Example 8 | 1.0 | 9 | 0.4 | 1 | 3.3 | 990 |
| Example 9 | 1.0 | 7 | 0.4 | 3 | 3.4 | 1,670 |
| Example 10 | 1.0 | 5 | 0.4 | 5 | 3.4 | 2,110 |
| Example 11 | 1.0 | 3 | 0.4 | 7 | 3.5 | 2,700 |
| Example 12 | — | 0 | 0.4 | 4 | 3.2 | 1,730 |
| Example 13 | — | 0 | 0.4 | 10 | 3.4 | 3,240 |
| Example 14 | 1.2 | 10 | — | 0 | 3.3 | 740 |
| Example 15 | 0.8 | 10 | — | 0 | 3.4 | 755 |
| Example 16 | 0.6 | 10 | — | 0 | 3.5 | 810 |
| Example 17 | — | 0[2] | — | 0[2] | 3.4 | 1,840 |
| Example 18 | 1.0 | 38[3] | 0.5 | 16[3] | 3.6 | 2,710 |
| Example 19 | — | 0 | — | 0 | 3.1 | 3,050 |
| Comparative Example 1 | 1.0 | 65 | — | 0 | 3.9 | 8,250 |
| Comparative Example 2 | 1.0 | 50 | 0.4 | 5 | 3.9 | 6,980 |

TABLE 1-continued

| Examples and Comparative Examples | Number of bent portion satisfying the formula: R/L ≧ 0.6[1)] in pipes 30, 32, 41 and 43[4)] | | Number of bent portion satisfying the formula: R/L < 0.6[1] in pipes 30, 32, 41 and 43[4)] | | Evaluation of color of an aromatic polycarbonate (b* value) | Amount of foreign matter having a particle diameter of 0.5 to 1.0 μm in an aromatic polycarbonate (piece/g) |
|---|---|---|---|---|---|---|
| | Value of R/L[1)] ratio | Number of bent portion | Value of R/L[1)] ratio | Number of bent portion | | |
| Comparative Example 3 | 1.0 | 47 | 0.4 | 10 | 4.0 | 12,510 |
| Comparative Example 4 | 1.0 | 47 | 0.4 | 10 | 4.0 | —[4)] |

[1)]R represents the curvature radius (m) of the central line at the bent portion, and L represents the length (m) of the circumference of the figure of the inside cross-section of the pipe at the bent portion, or represents the smallest length (m) among the lengths of the circumferences of the figures of the inside cross-sections of the pipe at the bent portion when the lengths of the circumferences include different lengths.
[2)]In Example 17, pipes 49, 32, 41 and 43 of FIG. 5 constitute the viscous polycarbonate passage regions.
[3)]In Example 18, only pipes 41 and 43 constitute the viscous polycarbonate passage regions, and pipes 41 and 43 have no bent portion. In Example 18, pipes 30 and 32 (which do not constitute a viscous polycarbonate passage region) have 54 bent portions in total.
[4)]In Comparative Example 4, polymerization operation became impossible.

INDUSTRIAL APPLICABILITY

The method of the present invention is advantageous not only in that a high quality aromatic polycarbonate which is not only highly colorless, but also has a low foreign matter content can be easily produced, but also in that there is no need for a step of forcibly passing a final molten polycarbonate product (inherently having a high melt viscosity) through a polymer filter by using an extruder, so that problems do not arise, such as clogging of the polymer filter or an increase in load on the extruder. Therefore, the aromatic polycarbonate obtained by the method of the present invention can be advantageously used in a wide variety of application fields, especially as a material for an optical disk substrate.

What is claimed is:

1. In a method for producing an aromatic polycarbonate which comprises subjecting to a transesterification polymerization reaction at least one polymerizable material selected from the group consisting of:

a molten monomer mixture of an aromatic dihydroxy compound and a diaryl carbonate, and a molten prepolymer obtained by reacting an aromatic dihydroxy compound with a diaryl carbonate, said transesterification polymerization reaction being performed in one or more polymerizers which is or are connected through a pipeline system toward an outlet for a final aromatic polycarbonate product, wherein said pipeline system comprises one or more pipes through which a molten aromatic polycarbonate having a number average molecular weight increased by said transesterification polymerization reaction is passed while contacting an inner wall of the pipe or pipes, said pipeline system having at least one viscous polycarbonate passage region in which a molten aromatic polycarbonate having a number average molecular weight of 4,000 or more is passed through the pipe, the improvement comprising using a pipeline system in which the pipe or pipes in said at least one viscous polycarbonate passage region have no bent portion or not more than 50 bent portions in total, said bent portion being defined as a portion at which a central line longitudinally extending along the pipe exhibits a minimum or zero value with respect to a curvature radius of said central line, wherein said central line is defined as a line formed by connecting the centroids of the figures of inside cross-sections of the pipe, wherein said inside cross-sections are taken along planes perpendicular to the flow direction of a molten polycarbonate in the pipe and are defined by the aligned circumferences of the inner wall of said pipe, wherein, when said central line exhibits a minimum value with respect to the curvature radius thereof at the bent portion, said central line assumes an arc or a non-arc curve at the bent portion; and when said central line exhibits a zero value with respect to the curvature radius thereof at the bent portion, the central line assumes a corner at the bent portion, wherein there is no need for a step of forcibly passing a final molten polycarbonate product through a polymer filter by using an extruder.

2. The method according to claim 1, wherein, when the pipe or pipes in said at least one viscous polycarbonate passage region have not more than 50 bent portions in total, substantially all of said bent portions satisfy the following formula (1):

$$R/L \geq 0.6 \tag{1}$$

wherein:

R represents the curvature radius (m) of the central line at the bent portion; and L represents the length (m) of the circumference of the figure of the inside cross-section of the pipe at the bent portion, or represents the smallest length (m) among the lengths of the circumferences of the figures of the inside cross-sections of the pipe at the bent portion when the lengths of said circumferences include different lengths.

3. The method according to claim 1 or 2, wherein the pipe or pipes in said at least one viscous polycarbonate passage region have a total length of 50 m or less as measured along said central line.

4. The method according to claim 1 or 2, wherein the molten aromatic polycarbonate is subjected to filtration by means of a polymer filter having a pore size corresponding to a filtration cut-off size of less than 1 μm, wherein said polymer filter is provided at least at one position in the pipeline system at which the conversion of the aromatic dihydroxy compound is in the range of from 5 to 90%.

5. The method according to claim 3, wherein the molten aromatic polycarbonate is subjected to filtration by means of a polymer filter having a pore size corresponding to a filtration cut-off size of less than 1 μm, wherein said polymer filter is provided at least at one position in the pipeline system at which the conversion of the aromatic dihydroxy compound is in the range of from 5 to 90%.

6. An aromatic polycarbonate produced by the method of claim 1 or 2.

7. An aromatic polycarbonate produced by the method of claim 3.

8. An aromatic polycarbonate produced by the method of claim 4.

9. An aromatic polycarbonate produced by the method of claim 5.

10. The method according to claim 1, wherein said arc or said non-arc curve at the bent portion has a curvature radius of not larger than 5 m.

* * * * *